Patented Dec. 9, 1952

2,621,167

UNITED STATES PATENT OFFICE 2,621,167

PRODUCTION OF TRANS-QUINITOL/SUCCINIC ACID POLYESTERS

James Wotherspoon Fisher, Spondon, near Derby, and James Lincoln, London, England, assignors to Celanese Corporation of America, a corporation of Delaware No Drawing. Application April 8, 1948, Serial No. 19,886. In Great Britain April 28, 1947

6 Claims. (Cl. 260—75)

This invention relates to the production of polymeric materials and is especially concerned with linear polyesters.

Generally linear condensation polymers are produced by condensation of reagents containing two and only two reactive groups, the reactive groups forming linkages, e. g. ester linkages, which join the original molecules together to form the polymer chain. Thus, for example, a linear polyester may be produced by condensing with itself a hydroxycarboxylic acid or by condensing a glycol with a dicarboxylic acid, the carboxylic groups reacting with the hydroxy groups to form the ester linkages. With the ordinary aliphatic glycols and dicarboxylic acids, it is virtually impossible to produce a polyester of relatively high melting point, say a melting point above about 180 or 200°. The same applies to the ordinary aliphatic hydroxy-carboxylic acids. In most cases the melting points of the polymers produced are in the range of 80–150° C., which is much too low for many purposes and particularly for most applications of filaments and some applications of films.

We have now found that in the production of polyesters from dihydroxy compounds and dibasic acids, particularly dicarboxylic acids, much improved results as regards melting point may be obtained by employing as the dihydroxy compound trans-quinitol (trans-1.4-cyclohexanediol). Generally it is desirable to use as the other component a body such as a purely aliphatic compound which does not itself contribute very highly to producing a higher melting point, since the trans-quinitol itself is productive of high melting points as compared with aliphatic glycols. Thus as the dicarboxylic acid component we may use succinic acid, adipic acid, glutaric acid, oxalic acid (especially as ester) or sebacic acid or mixtures thereof. However, dicarboxylic acids which themselves contribute to high melting point by having in their structure an aromatic or other nucleus, for example terephthalic acid, diphenyl-4.4'-dicarboxylic acid and 4.4'-dicarboxy-dibenzyl, may be used, and the melting point of the polymer brought down by using an appropriate amount of another bifunctional polyester-forming reagent, for example ω-hydroxy-caproic acid or an aliphatic glycol or a long chain aliphatic dicarboxylic acid. The presence of a small quantity of a volatile glycol in the reaction mixture appears to make the reaction go more smoothly.

The trans-quinitol may be used in the free state or as the formate or acetate, while the dicarboxylic acids may again be used as the free acids, or as the simple esters, such as the methyl or ethyl esters.

The condensations to produce the polymers of the present invention can be effected generally by heating the components at temperatures of 100–350° C., but of course below decomposition temperatures, and preferably at 200–280° C. or 300° C. If desired, catalysts may be present, for example catalysts facilitating the elimination of water, such as p-toluene sulphonic acid or a trace of phosphoric acid, or ester interchange catalysts such as alkali metals or magnesium or alkali metal alcoholates. When a volatile by-product is produced such as water, an alcohol or a phenol, it is of advantage to conduct the reaction, at least in its later stages, in vacuo and preferably under an extremely low absolute pressure. The condensations are preferably carried out in an atmosphere of an oxygen-free inert gas, for example hydrogen or nitrogen, a stream of which may be passed over or through the reaction mixture.

The poly-esterifications are best effected with the reagents and their products of reaction in the molten state or in solution in a suitable solvent medium, for example m-cresol or phenol which is liquid at the reaction temperature.

The trans-quinitol is slightly volatile under the usual reaction conditions and for this reason, in order to obtain high molecular weights, it is advisable to use it in an excess over the dicarboxylic acid with which it is to combine, for example an excess amounting to some 10–25% molar excess. The same applies with respect to any volatile glycol which is used in the reaction mixture.

As already indicated, the polymers of the invention are of value in connection with the production of fibres, films, lacquers and molding masses, and the invention includes such applications of the polymers, e. g. the production of filaments from solutions of the polymers by wet or dry spinning methods or directly from the molten polymer.

The following examples illustrate the invention, the parts being by weight:

Example 1

20 parts of trans-quinitol (melting point 140–141° C.), 20.3 parts of succinic acid and 0.036 parts of p-toluene sulphonic acid were heated together in a slow stream of hydrogen at 200° C. for 0.75 hours, when the polymer had become solid. The temperature was raised to 230° C. and maintained for a further 1.5 hours when the polymer again solidified. The temperature was then raised to 275° C., the polymer melting to a light-coloured viscous liquid, and was maintained at that value for 1.5 hours at atmospheric pressure and a further 0.5 hours under an absolute pressure of 3–4 mms. of mercury. The final polymer was a light-coloured, semi-translucent, tough solid melting at 240–243° C. and formed strong films.

*Example 2*

20 parts of trans-quinitol (melting point 140–141° C.), 30 parts of diethyl succinate, 3 parts of ethylene glycol and a quantity of sodium ethoxide solution prepared by dissolving 0.05 parts of metallic sodium in 16 parts of absolute ethyl alcohol were refluxed with a small quantity of magnesium ribbon for 2 hours at 160° C. using cold water cooling in the reflux. The condenser water was then turned off and heating continued at 180° C. for 1 hour. The condenser was then removed and a slow stream of hydrogen bubbled through the melt first at 200° C. for 1 hour, then at 230° C. for 5 hours and again at 270° C. for 0.5 hour. During this heating the polymer began to exhibit fibre-forming properties. A final heating was carried out at 270° C. for 0.5 hours at an absolute pressure of 3–4 mms. of mercury. The final polymer was similar in appearance to that of Example 1 and had a melting point of 226–228° C. Its analysis showed G 59.05% and H 6.93%.

*Example 3*

24 parts of trans-quinitol (melting point 140–141° C.), 2.1 parts of ethylene glycol and 20.3 parts of succinic acid (about 20 molar percent excess of transquinitol over succinic acid and about 40 molar percent excess of total hydroxy over carboxy) were heated with 0.065 parts of p-toluene sulphonic acid for 15 hours at 180° C. by which time the polymer had solidified. The heating was continued at 220° C. for 4 hours (the polymer again solidified), at 250° C. for 2 hours and at 265° C. for 2 hours. The polymer was then heated at 240° C. for 1.5 hours at an absolute pressure of 3–4 mms., at which stage it began to show fibre-forming properties, and finally at 255° C. for 4 hours at the same pressure. The polymer was again a light-coloured solid, melting at 225–230° C. The analysis was C 59.55%; H 6.99%.

Having described our invention, what we desire to secure by Letters Patent is:

1. Process for the production of linear polyesters, which comprises condensing substances selected from the group consisting of succinic acid and its ester-forming derivatives with substances selected from the group consisting of glycols, whose hydroxy groups are their sole reacting groups, and esters thereof, the second-mentioned substances being present in a proportion at least molecularly equivalent to the first-mentioned substances and being constituted as to at least 78% of their moles by trans-quinitol and its esters and the remainder by ethylene glycol and its esters.

2. Process for the production of a linear polyester, which comprises condensing succinic acid with trans-quinitol and ethylene glycol, the trans-quinitol being present in a proportion at least molecularly equivalent to the succinic acid and the glycol being present in a proportion at most 15% by weight of the trans-quinitol.

3. Process for the production of a linear polyester, which comprises heating a reaction mixture comprising as sole reagents trans-quinitol and succinic acid, the trans-quinitol being present in a quantity at least molecularly equivalent to the succinic acid.

4. Process for the production of a linear polyester, which comprises condensing succinic acid with trans-quinitol and ethylene glycol, the trans-quinitol being present in a proportion at least molecularly equivalent to the succinic acid and the glycol being present in a proportion at most 15% by weight of the trans-quinitol, and continuing the condensation until a product having filament-forming properties is produced.

5. Process for the production of a linear polyester, which comprises heating a reaction mixture comprising as sole reagents trans-quinitol and succinic acid, the trans-quinitol being present in a quantity at least molecularly equivalent to the succinic acid, and continuing the heating until a product having filament-forming properties is produced.

6. A linear polyester in which the structural unit consists of trans-quinitol and succinic acid.

JAMES WOTHERSPOON FISHER.
JAMES LINCOLN.

REFERENCES CITED

The following references are of record in the file of this patent:

UNITED STATES PATENTS

| Number | Name | Date |
|---|---|---|
| 2,048,774 | Bolton | July 28, 1936 |
| 2,284,637 | Catlin | June 2, 1942 |
| 2,315,613 | Frosch | Apr. 6, 1943 |

OTHER REFERENCES

Serial No. 239,456, Rinke et al. (A. P. C.), published April 20, 1943.

Oldberg et al. J. A. C. S. 66 pp. 1096–9, 1944 Abstracted in C. A. 38 4913 (1944).

Rothstien Ann. Chim. 14 pp. 461–598, 1930 Abstracted in C. A. 26 99 (1930).

Palfray et al. Bull. Soc. Chim. 45, pp. 855–62, 1929 Abstracted in C. A. 24 1093 (1930).